(No Model.)
S. NEEDLES.
SAD IRON.
No. 367,225.    Patented July 26, 1887.
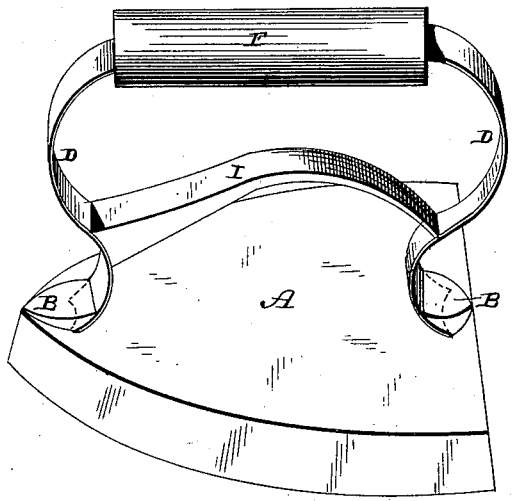
Witnesses.
L. H. Gardner
A. W. Brecht
Inventor.
S. Needles,
per F. A. Lehmann,
atty.

UNITED STATES PATENT OFFICE.

SIMGESMER NEEDLES, OF SEDALIA, MISSOURI.

SAD-IRON.

SPECIFICATION forming part of Letters Patent No. 367,225, dated July 26, 1887.

Application filed May 11, 1886. Serial No. 201,843. (No model.)

*To all whom it may concern:*

Be it known that I, SIMGESMER NEEDLES, of Sedalia, in the county of Pettis and State of Missouri, have invented certain new and useful Improvements in Sad-Irons; and I do hereby declare the following to be a full, clear, and exact description of the invention, such as will enable others skilled in the art to which it pertains to make and use it, reference being had to the accompanying drawing, which forms part of this specification.

My invention relates to an improvement in sad-irons; and it consists in the combination of the iron having suitable projections which are recessed upon their inner sides to engage with the handle cast or otherwise formed upon its top, a spring-handle, and a prong connected to the handle, by means of which the handle can be disengaged from the iron at any time, as will be more fully described hereinafter.

The object of my invention is to provide a spring detachable handle for sad-irons with a prong or projection which can be readily operated by the fingers without disconnecting the hand from the handle, and thus quickly attach and detach the handle from the iron at any time.

The accompanying drawing represents a perspective of an iron embodying my invention.

A represents an ordinary sad-iron, which is provided with projections B upon its top, and which have their inner sides recessed, so as to receive the lower ends of the handle D. This handle is made from a single elastic piece of material, which has its lower ends suitably shaped and made to form connection with the projections, and which is provided with the wooden piece F at its center in the usual manner. This handle being formed from a single piece of elastic metal, its ends are made movable in relation to each other, so as to be readily attached and detached from the projections upon the iron. Connected to the front portion of this elastic handle is a horn or lever, I, which projects backward under the wooden part of the handle, so as to touch the back arm and act as a brace to hold the handle firmly in position when attached to the base, and which can be readily operated by the fingers without releasing the hold upon the handle.

I am aware than an iron-handle has heretofore been made having two spring-prongs connected together by means of a spring, the prongs and spring being formed in a single piece. My invention differs from this in making the ends of my handle entirely disconnected and connecting to one end of the handle a prong, which serves both to operate this end and to brace the two ends apart, so that they cannot accidentally be moved toward each other to release the iron.

Having thus described my invention, I claim—

1. A sad-iron having recessed projections formed upon its base, the elastic handle, and the horn or prong attached to one end of the handle, the parts being combined and arranged to operate substantially as shown and described.

2. The combination, in a sad-iron, of a base having recessed projections upon its top, with a detachable spring-handle, a prong secured at one end to one of the ends of the handle, and having its free end to bear against the inner side of the other end of the handle, substantially as specified.

In testimony whereof I affix my signature in presence of two witnesses.

SIMGESMER NEEDLES.

Witnesses:
E. E. JOHNSTON,
J. S. HATFIELD.